US008560704B2

(12) United States Patent
Chang et al.

(10) Patent No.: US 8,560,704 B2
(45) Date of Patent: Oct. 15, 2013

(54) METHOD OF ESTABLISHING CHARGED CONNECTION USING SCREEN SHARING APPLICATION BETWEEN MULTI-PLATFORMS

(75) Inventors: Kuo-Lung Chang, New Taipei (TW);
Hsing-Yung Wang, New Taipei (TW);
Meng-Chung Hung, New Taipei (TW);
Kuan-Yu Chou, New Taipei (TW);
Shih-Pin Liu, New Taipei (TW);
Chin-Jung Fan, New Taipei (TW);
Li-Ger Chen, New Taipei (TW)

(73) Assignee: Awind Inc., New Taipei (TW)

( * ) Notice: Subject to any disclaimer, the term of this patent is extended or adjusted under 35 U.S.C. 154(b) by 155 days.

(21) Appl. No.: 13/217,217

(22) Filed: Aug. 24, 2011

(65) Prior Publication Data
US 2013/0054815 A1    Feb. 28, 2013

(51) Int. Cl.
*G06F 15/16*      (2006.01)
*H04M 15/00*      (2006.01)

(52) U.S. Cl.
USPC .............. 709/227; 709/231; 705/34; 380/30; 379/114.1

(58) Field of Classification Search
None
See application file for complete search history.

(56) References Cited

U.S. PATENT DOCUMENTS

| | | | |
|---|---|---|---|
| 6,011,837 A * | 1/2000 | Malik | 379/114.1 |
| 7,577,751 B2 * | 8/2009 | Vinson et al. | 709/231 |
| 8,200,555 B2 * | 6/2012 | Auvenshine et al. | 705/34 |
| 2007/0189520 A1 * | 8/2007 | Altberg et al. | 380/30 |
| 2012/0324544 A1 * | 12/2012 | Kanetomo | 726/4 |

* cited by examiner

*Primary Examiner* — Wen-Tai Lin
(74) *Attorney, Agent, or Firm* — Chun-Ming Shih; HDLS IPR Services

(57) ABSTRACT

A method of establishing a charged connection using a screen sharing application between multi-platforms is disclosed. A transmitting end application is installed in a transmitting end apparatus of a sharing source. A receiving end application is installed in a receiving end apparatus of a sharing target. If the transmitting end application is a charged version, an unlimited connection is established for performing screen sharing between the transmitting end apparatus and any receiving end apparatus. If the transmitting end application is a free version, the method further confirms if the receiving end application is a charged version for deciding whether a limited connection or an unlimited connection should be established. Thus, it is assured that either the transmitting end application or the receiving end application is a charged version, the interests of application developers are protected and users are free from paying twice for establishing one connection.

10 Claims, 4 Drawing Sheets

METHOD OF ESTABLISHING CHARGED CONNECTION USING SCREEN SHARING APPLICATION BETWEEN MULTI-PLATFORMS

BACKGROUND OF THE INVENTION

1. Field of the Invention

The present invention relates to a method for establishing a connection between multi-platforms, in particular, the present invention relates to a method of establishing a charged connection between multi-platforms.

2. Description of Prior Art

In recent years, electronic industries grow rapidly and various electronic devices are widely used in everyday life. Users use electronic devices for entertaining purposes, such as displaying films and executing games. In addition, work efficiency is significantly improved with the convenient functions delivered by electronic devices.

The functions provided by electronic devices rely on the capabilities of hardware and associated software. For example, users play movies with film playing application on computers. In general, users purchase charged application or download free application depending on the marketing strategies of application developers. Nonetheless, when application is executed on a plurality of electronic devices, the charging mechanism is required to redesign by the application developer.

In an example of screen sharing application, a screen sharing application transmits multimedia data displayed on the screen of a first electronic device to the screen of a second electronic device via network systems. Under the circumstance, it is required to install a transmitting end screen sharing application (referred in the following as transmitting end application) on the first electronic device for transmitting data, and it is required to install a receiving end screen sharing application (referred in the following as receiving end application) on the second electronic device for receiving and processing data.

In view of application developers, when the above transmitting end applications and receiving end applications are free to download by users, it is convenient to use but difficult to collect charges. Accordingly, the interests of application developers are at risk. Further, when a transmitting end application and a receiving end application are both charged, users have to pay twice for performing the same function which is not appropriate. Thus, it is an option to charge either a transmitting end application or a receiving end application when performing the function via a network connection.

In order to provide the above screen sharing function to users, display devices in the markets (for example, a smart television, a projector, and a expanded device for supporting screen sharing), receiving end applications provided by application developers are installed in the devices by default in the factories. Thus, users are allowed to browse the display devices connected to a network and perform screen sharing with transmitting end applications after purchasing the above display devices. However, it is a bottleneck to overcome by application developers to work out on royalty collection mechanisms with manufacturers of display devices.

Part of the manufacturers are not willing to increase the manufacturing cost of display devices for installing free receiving end applications, and users are required to purchase and install charged transmitting end applications in a display device for performing screen sharing. Part of the manufacturers are willing to pay reasonable costs and install charged receiving end applications in a display device such that users are allowed to establish a connection with display devices via free transmitting end applications. However, there are concerns to application developers to resolve such as the reasonable royalties of the applications and the range of authorized functions to installed receiving end applications (for example, the platforms supported by a transmitting end application).

For example, when a display device is installed with a free receiving end application, users have to use a charged transmitting end application for establishing a connection. Otherwise, application developers cannot collect any charges. When a display device is installed with a charged receiving end application, it is required to assure that users do not use a charged transmitting end application for establishing a connection in order to avoid repetitive charging by application developer. In addition, when a display device is installed with a charged receiving end application and users use free transmitting end application for establishing a connection, it is required to judge if the receiving end application supports the transmitting end application used by users.

As mentioned above, it is desired in the market to provide a precise judging mechanism in the market to ensure the application developers to collect deserved charges, to reserve decision right for the manufacturers of pre-bundle free applications or charged applications in such devices, and to notify the users that it is unnecessary to pay twice for both transmitting end application and receiving end application, and also, the users need not to register twice separately for both applications for establishing an unlimited connection.

SUMMARY OF THE INVENTION

It is an objective of the present invention to provide a method of establishing a charged connection using a screen sharing application between multi-platforms. The method is used to assure that either of the transmitting end application and the receiving end application is a charged version. Accordingly, users do not need to purchase both charged transmitting end applications and charged receiving end applications and the interests of application developers and users are both protected.

In order to achieve the above objective, a transmitting end apparatus of a sharing source is installed with a transmitting end application, and a receiving end apparatus of a sharing target is installed with a receiving end application according to the present invention. When the transmitting end application is a charged version, the transmitting end apparatus establishes an unlimited connection with any receiving end apparatus for performing screen sharing. If the transmitting end application is a free version, it is required to further confirm if the receiving end application is a charged version in order to decide whether the connection to establish between the transmitting end apparatus and the receiving end apparatus is a limited connection or an unlimited connection.

The other objective of the present invention is to provide a method of establishing a charged connection using a screen sharing application between multi-platforms. When a receiving end application is installed in a receiving end apparatus by the third party, the receiving end application can be configured to decide which platforms are supported based on the amount of payment made to the application developer by a third party company. The purpose of the method is to provide a cooperation model between an application developer and third party.

In order to achieve the above objective, a transmitting end apparatus of a sharing source is installed with a transmitting end application, and a receiving end apparatus of a sharing target is installed with a receiving end application according to the present invention. If the transmitting end application is a free version, and the receiving end application is a charged version, it is required to further confirm if the charged receiving end application supports the platform used by the free transmitting end application in order to decide whether the connection to establish between the transmitting end apparatus and the receiving end apparatus is a limited connection or an unlimited connection.

A screen sharing application is used for transmitting the screen data of a transmitting end apparatus (for example a mobile phone) to a receiving end apparatus (for example a smart television), and the screen data of a transmitting end apparatus is displayed on the screen of the receiving end apparatus for performing the function similar to screen sharing via a network system. In contrast with the prior art, the advantage of the present invention is that a charged transmitting end application is useful in implementing screen sharing of a transmitting end apparatus to any receiving end apparatus, users do not need to purchase a charged receiving end application and user interests are protected. Further, if a transmitting end apparatus of a sharing source is installed with a free transmitting end application, and a receiving end apparatus of a sharing target is installed with a free receiving end application, users are allowed to establish a limited connection. Thus, it is assured that either of the apparatus is installed with a charged version application and the interests of application developers are protected.

BRIEF DESCRIPTION OF DRAWING

The features of the invention believed to be novel are set forth with particularity in the appended claims. The invention itself, however, may be best understood by reference to the following detailed description of the invention, which describes an exemplary embodiment of the invention, taken in conjunction with the accompanying drawings, in which:

DETAILED DESCRIPTION OF THE INVENTION

In cooperation with attached drawings, the technical contents and detailed description of the present invention are described thereinafter according to preferred embodiments, being not used to limit its executing scope. Any equivalent variation and modification made according to appended claims is all covered by the claims claimed by the present invention.

Figure 1:
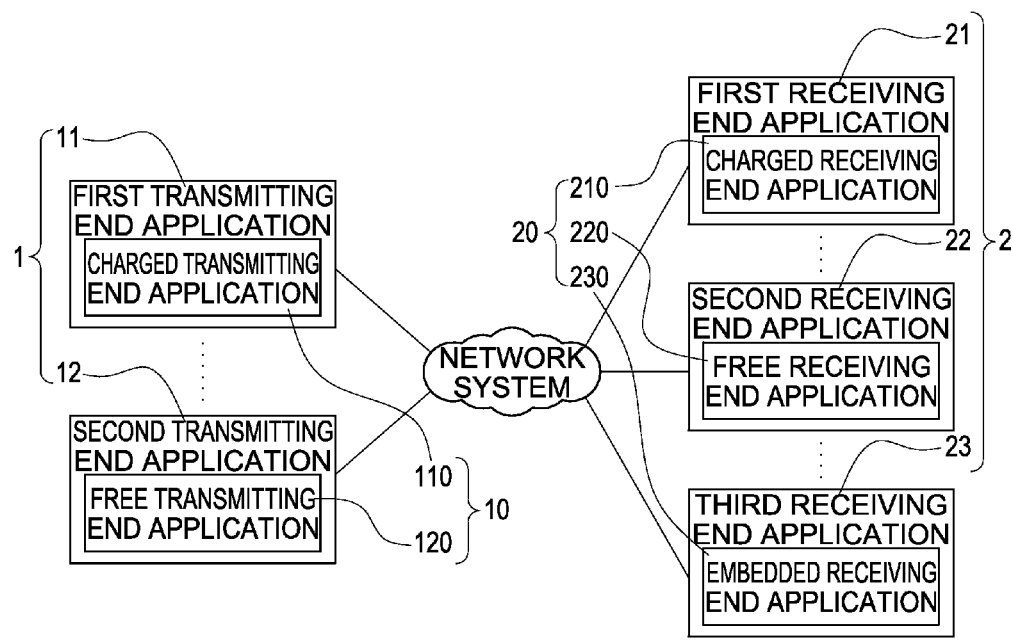
FIG. 1 is a first is a system block diagram of a preferred embodiment of the present invention.

FIG. 1 is a first is a system block diagram of a preferred embodiment of the present invention. According to the present invention, the method of establishing a charged connection using a screen sharing application between multi-platforms is used between at least a transmitting end apparatus 1 and at least a receiving end apparatus 2. The transmitting end apparatus 1 and the receiving end apparatus 2 are both installed with a screen sharing application. The screen sharing applications are used for perform screen sharing of the transmitting end apparatus 1 on the screen of the receiving end apparatus 2 via network systems to display. The differences of the screen sharing applications are that the transmitting end apparatus 1 is installed with a transmitting end application 10, and the receiving end apparatus 2 is installed a receiving end application 20.

As shown of FIG. 1, the transmitting end application 10 can be a charged transmitting end application 110 or a free transmitting end application 120. Users purchase from an application developer and install the charged transmitting end application 110 in a first transmitting end apparatus 11. Further, users may download and install the free transmitting end application 120, in a second transmitting end apparatus 12.

The receiving end application 20 can be a charged receiving end application 210 and a free receiving end application 220. Users purchase from an application developer and install the charged receiving end application 210 in a first receiving end apparatus 21. Further, users download and install the free receiving end application 220 in a second receiving end apparatus 22. It should be noted that, the receiving end apparatus 2 usually has a display screen larger than the screen of the transmitting end apparatus 1, for example, a smart television or large screen notebook computer. In addition, the receiving end application 20 can be an embedded receiving end application 230. The receiving end apparatus 2, for example, a third receiving end apparatus 23 is installed with an embedded receiving end application 230 by default in factories. Thus, users do not need to purchase and install the receiving end application separately which is more convenient to users.

Figure 2:
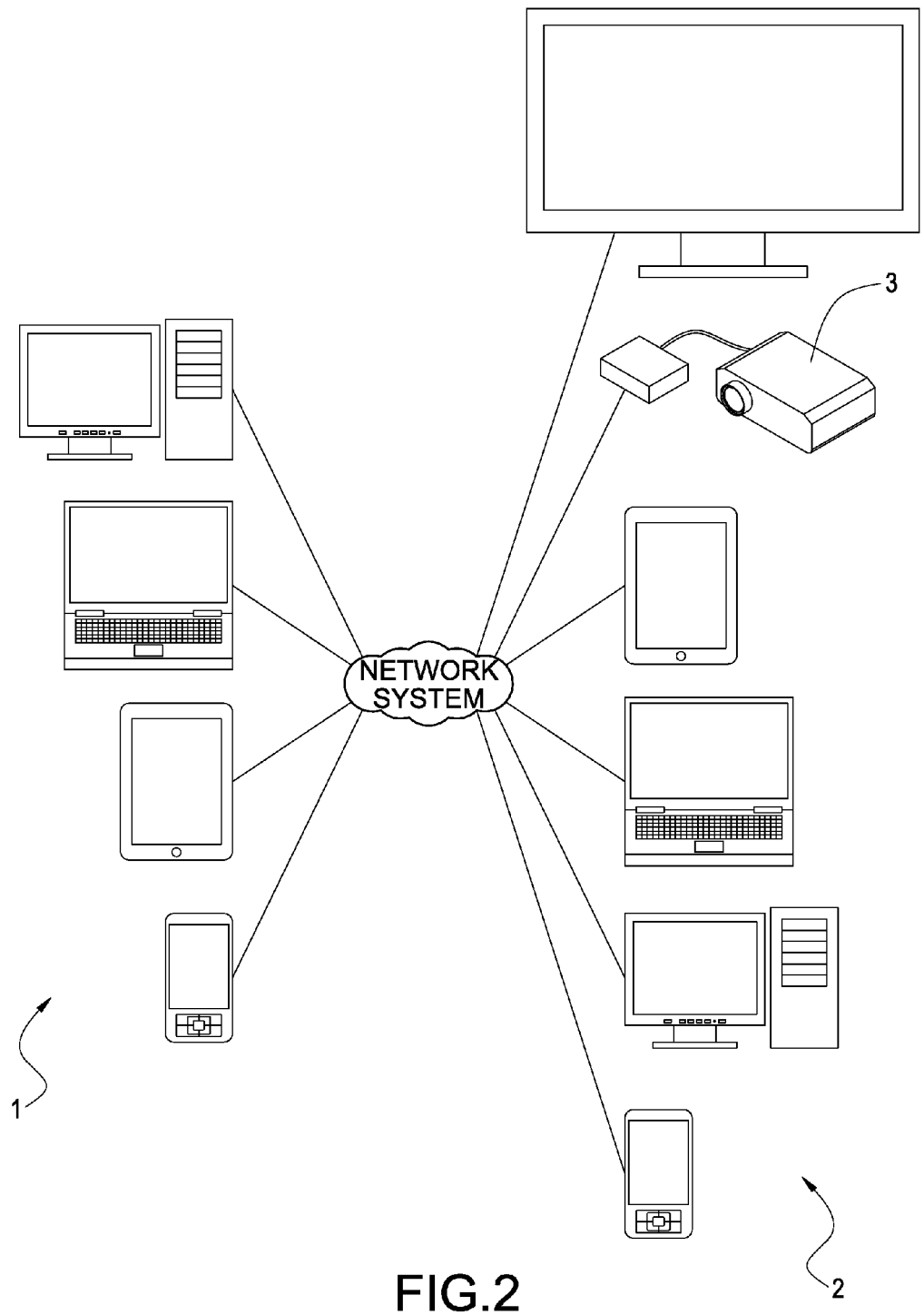
FIG. 2 is a system architecture diagram of a preferred embodiment of the present invention.

FIG. 2 is a system architecture diagram of a preferred embodiment of the present invention. In general, the transmitting end apparatus 1 can be a Personal Computer (PC), a Notebook Computer, a Tablet, a Smart phone etc. and are not limited thereto. The transmitting end apparatus 1 uses an internal controller for executing multimedia files, for example, playing movies or executing games and transmitting the screen of the transmitting end apparatus 1 via the screen sharing application installed.

The receiving end apparatus 2 can be a Personal Computer (PC), a Notebook Computer, a Tablet, a Smart phone etc. The screen sharing application is installed for receiving the data transmitted by the transmitting end apparatus 1. The transmitted data is decompressed, decoded and displayed on the screen. It should be noted that if users transmits the screen of the transmitting end apparatus 1 to an apparatus which is not capable of executing application automatically, for example, a projector 3. The receiving end apparatus 2 further can be a expanded device which is electrically coupled to the projector 3. The receiving end application 20 is installed and executed in the expanded device, and the expanded device receives data from the transmitting end apparatus 1. The received data is decompressed and decoded. The images and sounds generated by the data decompression and decoding are transmitted to the projector 3 for performing screen sharing.

The advantages of the present invention are that if a screen sharing application installed in the transmitting end apparatus 1 is a charged version, i.e. the charged transmitting end application 110, the transmitting end apparatus 1 establishes an unlimited connection with the receiving end apparatus 2 using any platform and performs screen sharing. For example, the first transmitting end apparatus 11 in FIG. 1 establishes an unlimited connection with the first receiving end apparatus 21, the second receiving end apparatus 22, and the third receiving end apparatus 23.

If the screen sharing application installed in the transmitting end apparatus 1 is a free version, i.e., the free transmitting end application 120, the free transmitting end application 120 has to check the version the receiving end application 20 of the sharing target before a connection is established. If the receiving end apparatus 2 of the sharing target is installed with the free receiving end application 220, a limited connection is established between the transmitting end apparatus 1 and the receiving end apparatus 2 (detailed in the following). On the other hand, if the receiving end apparatus 2 of the sharing target is installed with the charged receiving end application 210, an unlimited connection is established between the transmitting end apparatus 1 and the receiving end apparatus 2. In addition, screen sharing is performed after the connection is successfully connected.

It should be noted that an application developer decides which platforms used by the transmitting end application 120 are supported by the charged receiving end application 210 depending on the pricing of the charged receiving end application 210. As shown in Table A, a supporting schematic diagram of the receiving end application 20 is illustrated.

TABLE A

| receiving end application | free transmitting end application | | Pricing |
|---|---|---|---|
| | not supporting | supporting | |
| A | | Windows only | 0.99 |
| B | android/iOS/BB | Windows/Mac | 1.99 |
| C | android/Windows/BB | Mac/iOS | 1.99 |
| D | None | ALL | 3.99 |
| E | All | None | Free |

If the price of the receiving end application 20 is lower, for example, the retail price of an A application is USD$0.99 in Table A, an application developer configures the internal flag of the charged receiving end application 210 according to low retail price of the A application for defining that the A application only supports the windows platform used by the free transmitting end application 120. When the free transmitting end application 120 using a Mac platform establishes a connection with the A application, the free transmitting end application 120 has to confirm that the A application is a charged version, the free transmitting end application 120 further judges if the A application supports the Mac platform. As shown in Table A, the free transmitting end application 120 using the Mac platform cannot establish an unlimited connection with the A application. However, Table A is a preferred embodiment of the present invention and the scope of the invention is not limited thereto.

As the B application and the C application shown in Table A, when the retail price is higher, the application developer configures that the B application and the C application support more platforms. Take examples shown in Table A, the B application supports the Windows platform and the Mac platform but does not support the Android platform, the iOS platform and the Black Berry platform used by the free transmitting end application 120. In another example, the C application supports Mac platform and iOS platform used by the free transmitting end application 120, but does not support the Windows platform, the Android platform and the Black Berry platform. An internal flag of the receiving end application 20 is configured to define which platforms to support, but is not limited thereto.

As mentioned above, the receiving end application 20 can be an embedded receiving end application 230. For example, an embedded receiving end application 230 is installed in a smart television during manufacturing process in the factories. Television manufactures sign contracts with application developers according to marketing strategies and decide which embedded receiving end application 230 is installed with which smart television.

The television manufacturers pay reasonable royalties upon signing contracts. Application developers configure the embedded receiving end application 230 for supporting all platforms used by the free transmitting end application 120. As the D application shown in Table A, consumers purchase smart televisions and are allowed to establish an unlimited connection by the transmitting end apparatus 1 using any platform and perform screen sharing for displaying the screen on the smart televisions. On the other hand, if the manufacturers do not pay royalties, the application developers do not configure the embedded receiving end application 230 to support any platform used by the free transmitting end application 120. As the E application shown in Table A, consumers purchase the smart televisions and are required to purchase and install a charged transmitting end application 110 in the transmitting end apparatus 1 so as to establish an unlimited connection with smart televisions.

Figure 3A:
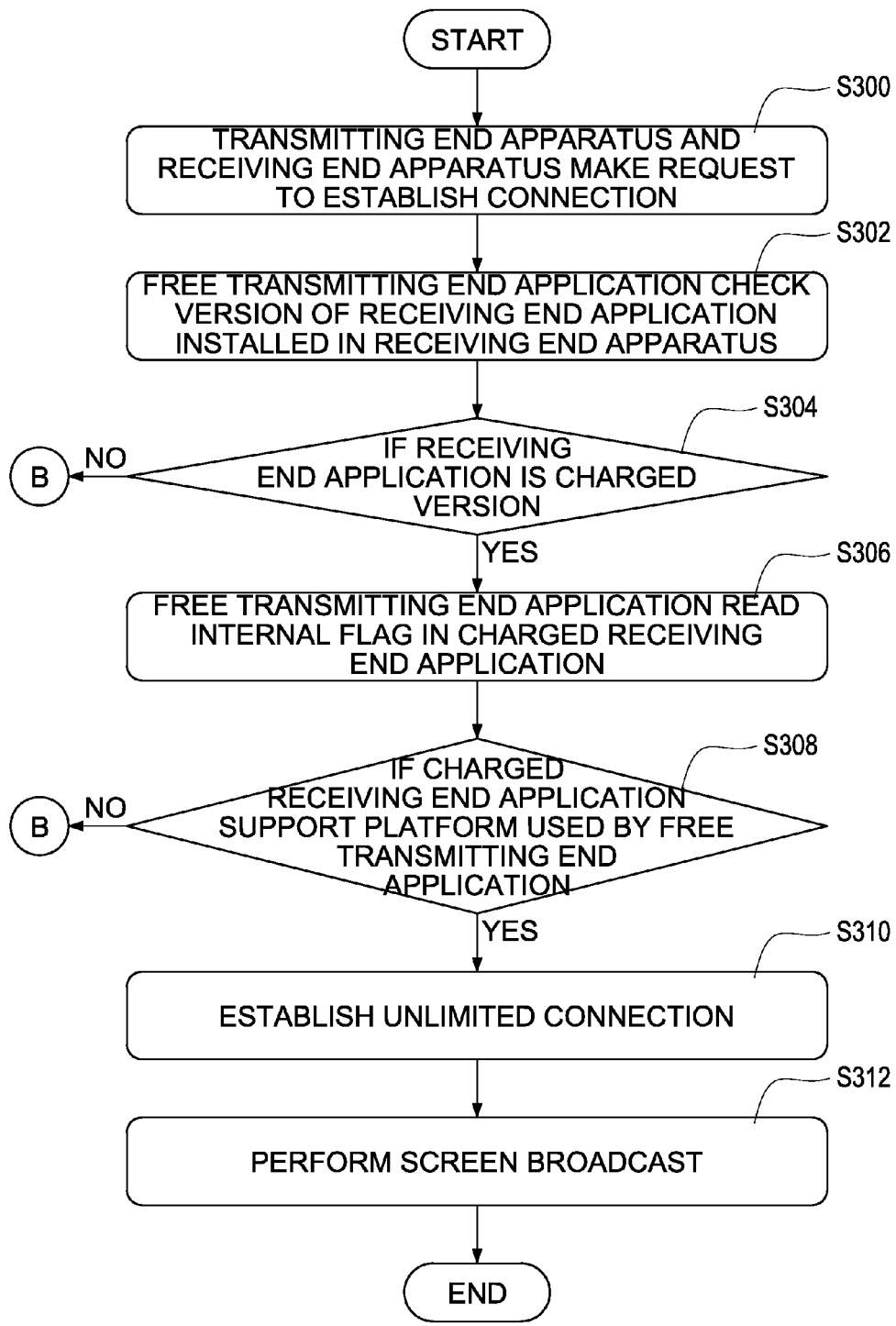
FIG. 3A is a first flow chart of a preferred embodiment according to the present invention.
Figure 3B:
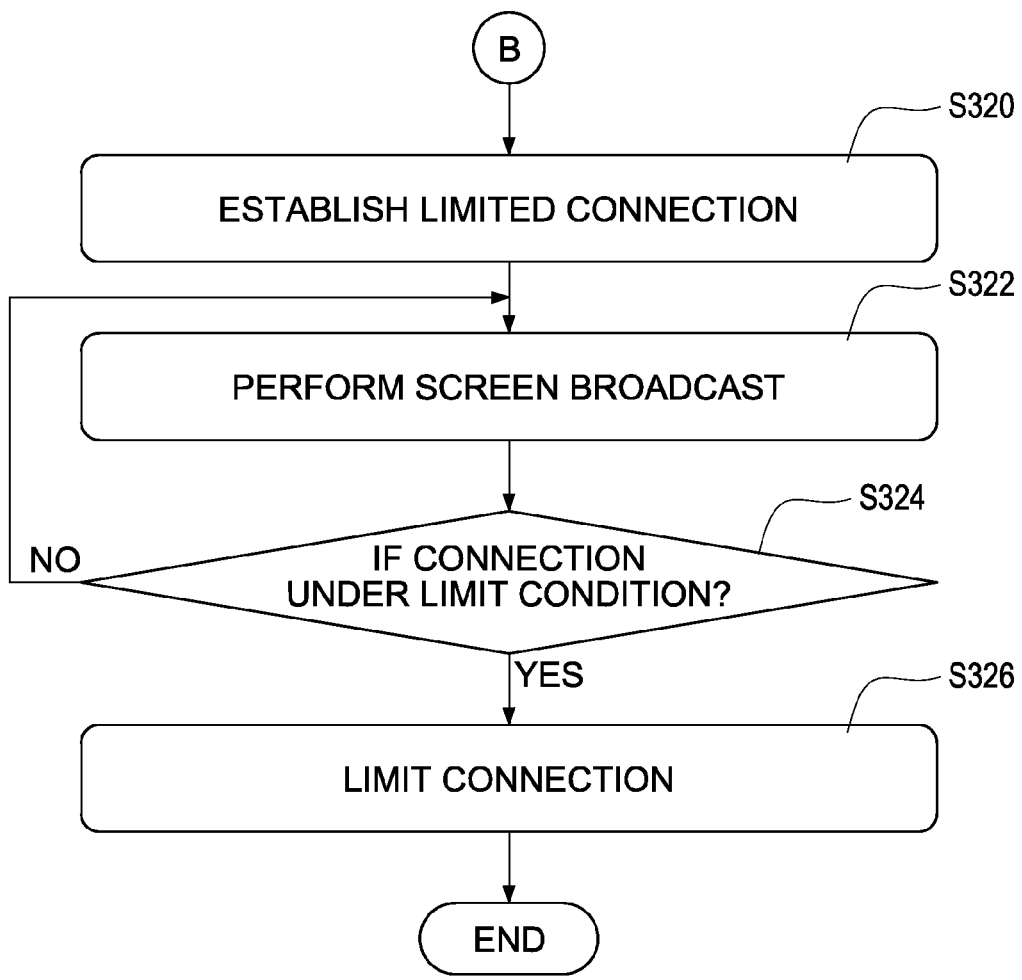
FIG. 3B is a second flow chart of a preferred embodiment according to the present invention.

FIG. 3A and FIG. 3B are a first flow chart and a second flow chart of a preferred embodiment according to the present invention. Firstly, the transmitting end apparatus 1 and the receiving end apparatus 2 make a request to establish a connection (step S300). The connection request can be made by the transmitting end apparatus 1 or the receiving end apparatus 2, and is not limited thereto. Next, if the transmitting end apparatus 1 is installed with the charged transmitting end application 110, the transmitting end apparatus 1 establishes a connection directly with the receiving end apparatus 2. If the transmitting end apparatus 1 is installed with the free transmitting end application 120, the free transmitting end application 120 checks the version of the receiving end application 20 installed in the receiving end apparatus 2 (step S302).

After S302, the free transmitting end application 110 judge if the receiving end application 20 is a charged version (step S304). If the receiving end application 20 is a charged version, i.e. the charged receiving end application 210, the free transmitting end application 120 further reads the internal flag in the charged receiving end application 210 (step S306). The flag is used for judging if the charged receiving end application 210 supports the platform used by the free transmitting end application 120 (step S308). If the charged receiving end application 210 supports the platform used by the free transmitting end application 120, an unlimited connection is established between the transmitting end apparatus 1 and the receiving end apparatus 2 (step S310), and screen sharing is performed after a connection is successfully established (step S312).

However, the step S304 moves to judge if the receiving end application 20 is a free version, or the receiving end application 20 is a charged version. When the step S308 judges the charged receiving end application 210 does not support the platform used by the free transmitting end application 120, and the method moves to steps Shown in FIG. 3B.

According to the mentioned above status, a limited connection is established between the transmitting end apparatus 1 and the receiving end apparatus 2 (step S320), and the screen sharing is performed after a connection is successfully established, (step S322). A limited connection is established between the transmitting end apparatus 1 and the receiving end apparatus 2. Consequently, the free transmitting end application 120 has to judge if the connection is under a limit condition (step S324). For example, the limit condition is a limit of the connection time. When the connection time is up to 5 minutes, the limit condition occurs. The above description is provided as an example and the scope is not limited thereto.

If the connection is not under the limit condition, the transmitting end apparatus 1 and the receiving end apparatus 2 continues to perform screen sharing. When the connection is under the limit condition, the connection between the apparatus 1 and apparatus 2 is limited (step S326). For example, the connection is forcibly disconnected between the transmitting end apparatus 1 and the receiving end apparatus 2, or a charge reminder message is displayed on the screen of the transmitting end apparatus 1 and/or the receiving end apparatus 2 for reminding users to purchase a charged version application etc., but the scope of the invention is not limited thereto.

It should be noted that, the above steps are used for assuring at least either the transmitting end apparatus 1 or the receiving end apparatus 2 is an application of charged version. Accordingly, given the transmitting end apparatus 1 or the receiving end apparatus 2 uses the Windows platform, users are not required to provide registration code or perform authorization procedure online when installs an application. Thus, the installing process is made convenient to users.

As the skilled person will appreciate, various changes and modifications can be made to the described embodiments. It is intended to include all such variations, modifications and equivalents which fall within the scope of the invention, as defined in the accompanying claims.

What is claimed is:

1. A method of establishing a charged connection using a screen sharing application between multi- platforms, the method used between a transmitting end apparatus of a sharing source and a receiving end apparatus of a sharing target, the transmitting end apparatus being installed with a transmitting end application, the receiving end apparatus being installed with a receiving end application, wherein the transmitting end application is a free transmitting end application, the method of establishing a charged connection, comprising:
    a) making a request to establish a connection between the transmitting end apparatus and the receiving end apparatus;
    b) judging at the free transmitting end application if the receiving end application is a charged version;
    c) establishing an unlimited connection between the transmitting end apparatus and the receiving end apparatus if the receiving end application is a charged version;
    d) performing screen sharing at the transmitting end apparatus on the receiving end apparatus via a network system;
    e) establishing a limited connection between the transmitting end apparatus and the receiving end apparatus if the receiving end application is a free version following steps b;
    f) performing screen sharing at the transmitting end apparatus on the receiving end apparatus via a network system;
    g) determining if the connection between the transmitting end apparatus and the receiving end apparatus is under a limit condition following steps f); and
    h) limiting the connection between the transmitting end apparatus and the receiving end apparatus if the connection between the transmitting end apparatus and the receiving end apparatus are under the limit condition.

2. The method of establishing a charged connection using a screen sharing application between multi- platforms of claim 1, wherein the limit condition is a limit of a connection time.

3. The method of establishing a charged connection using a screen sharing application between multi- platforms of claim 1, wherein the steps h is forcibly disconnecting the connection between the transmitting end apparatus and the receiving end apparatus.

4. The method of establishing a charged connection using a screen sharing application between multi- platforms of claim 1, wherein the steps h is displaying a charge reminder message on the transmitting end apparatus and the screen of the receiving end apparatus.

5. A method of establishing a charged connection using a screen sharing application between multi- platforms, the method used between a transmitting end apparatus of a sharing source and a receiving end apparatus of a sharing target, the transmitting end apparatus being installed with a transmitting end application, the receiving end apparatus being installed with a receiving end application, wherein the transmitting end application is a free transmitting end application, the method of establishing a charged connection, comprising:
    a) making a request to establish a connection between the transmitting end apparatus and the receiving end apparatus;
    b) judging at the free transmitting end application if the receiving end application is a charged version;
    c) determining further if the charged receiving end application supports the platform used by the free transmitting end application if the receiving end application is a charged version;
    d) establishing an unlimited connection between the transmitting end apparatus and the receiving end apparatus if the charged receiving end application supports the platform used by the free transmitting end application; and
    e) performing screen sharing at the transmitting end apparatus on the receiving end apparatus via a network system.

6. The method of establishing a charged connection using a screen sharing application between multi- platforms of claim 5, wherein the steps c is reading the internal flag of the charged receiving end application at the free transmitting end application for judging if the charged receiving end application supports the platform used by the free transmitting end application.

7. The method of establishing a charged connection using a screen sharing application between multi- platforms of claim 5, wherein the method further comprises the following steps:
    f) establishing a limited connection between the transmitting end apparatus and the receiving end apparatus when the receiving end application is a free version or a charged version, but the charged receiving end application does not support the platform used by the free transmitting end application;
    g) performing screen sharing at the transmitting end apparatus on the receiving end apparatus via a network system following steps f;
    h) judging if the connection between the transmitting end apparatus and the receiving end apparatus is under a limit condition following steps g; and
    i) limiting the connection between the transmitting end apparatus and the receiving end apparatus if the connection between the transmitting end apparatus and the receiving end apparatus is under the limit condition.

8. The method of establishing a charged connection using a screen sharing application between multi- platforms of claim 7, wherein the limit condition is a limit of the connection time.

9. The method of establishing a charged connection using a screen sharing application between multi- platforms of claim 7, wherein the steps i is forcibly disconnecting the connection between the transmitting end apparatus and the receiving end apparatus.

10. The method of establishing a charged connection using a screen sharing application between multi- platforms of claim 7, wherein the steps i is displaying a charge reminder message on the transmitting end apparatus and the screen of the receiving end apparatus.

* * * * *